United States Patent
Contractor et al.

(10) Patent No.: US 12,084,585 B2
(45) Date of Patent: Sep. 10, 2024

(54) AQUEOUS ENERGY CURABLE INKJET INKS

(71) Applicant: Kao Corporation, Tokyo (JP)

(72) Inventors: Muslim H. Contractor, Mason, OH (US); Spencer Q. Torline, Cincinnati, OH (US); Stephen J. Cummings, Mason, OH (US); Stephen Buchanan, Mason, OH (US)

(73) Assignee: Kao Corporation, Tokyo (JP)

( * ) Notice: Subject to any disclaimer, the term of this patent is extended or adjusted under 35 U.S.C. 154(b) by 120 days.

(21) Appl. No.: 17/789,812

(22) PCT Filed: Jan. 10, 2020

(86) PCT No.: PCT/US2020/013063
§ 371 (c)(1),
(2) Date: Jun. 29, 2022

(87) PCT Pub. No.: WO2021/141597
PCT Pub. Date: Jul. 15, 2021

(65) Prior Publication Data
US 2023/0048141 A1  Feb. 16, 2023

(51) Int. Cl.
*C09D 11/322* (2014.01)
*C09D 11/107* (2014.01)
*C09D 11/36* (2014.01)
*C09D 11/38* (2014.01)

(52) U.S. Cl.
CPC .......... *C09D 11/322* (2013.01); *C09D 11/107* (2013.01); *C09D 11/36* (2013.01); *C09D 11/38* (2013.01)

(58) Field of Classification Search
CPC ..... C09D 11/322; C09D 11/107; C09D 11/36; C09D 11/38; C09D 11/101; C09D 11/102; C09D 11/106
See application file for complete search history.

(56) References Cited

U.S. PATENT DOCUMENTS

| | | |
|---|---|---|
| 5,151,454 A | 9/1992 | Goto et al. |
| 5,952,401 A | 9/1999 | Kimura et al. |
| 7,097,295 B1 | 8/2006 | Fukuda |
| 2007/0054981 A1 | 3/2007 | Yanagi et al. |
| 2008/0192100 A1 | 8/2008 | Nakajima |
| 2011/0195235 A1 | 8/2011 | Kato et al. |
| 2011/0242192 A1 | 10/2011 | Sasada et al. |
| 2013/0050366 A1 | 2/2013 | Sasada et al. |
| 2015/0064423 A1 | 3/2015 | Ohmoto |
| 2015/0290610 A1 | 10/2015 | Roose et al. |
| 2016/0130461 A1 | 5/2016 | Reiter et al. |
| 2016/0145449 A1 | 5/2016 | Hilgers |
| 2018/0086927 A1 | 3/2018 | Shimizu et al. |
| 2023/0029231 A1 | 1/2023 | Nakashima et al. |

FOREIGN PATENT DOCUMENTS

| | | | |
|---|---|---|---|
| CN | 102233758 A | 11/2011 | |
| EP | 0 658 607 A1 | 6/1995 | |
| EP | 1 792 744 A1 | 6/2007 | |
| EP | 2 371 572 A1 | 10/2011 | |
| EP | 4 083 150 A1 | 11/2022 | |
| JP | 2007-100071 A | 4/2007 | |
| JP | 2011-195737 A | 10/2011 | |
| JP | 2012-52066 A | 3/2012 | |
| JP | 2012-97191 A | 5/2012 | |
| JP | 2012-144645 A | 8/2012 | |
| JP | 2014-46483 A | 3/2014 | |
| JP | 2014-189715 A | 10/2014 | |
| JP | 2014-529637 A | 11/2014 | |
| JP | 2015-224340 A | 12/2015 | |
| JP | 2018-123293 A | 8/2018 | |
| JP | 2018-149803 A | 9/2018 | |
| JP | 2019-5992 A | 1/2019 | |
| JP | 2019-218514 A | 12/2019 | |
| WO | WO 2015/068292 A1 | 5/2015 | |
| WO | WO-2018182040 A1 * | 10/2018 | ............ B41J 11/002 |
| WO | WO 2019/204371 A1 | 10/2019 | |
| WO | WO 2020/008508 A1 | 1/2020 | |

OTHER PUBLICATIONS

Contractor Muslim et al., "Radiation Curable Ink Compositions, Printed Articles, and Methods of Using the Same" (WO 2018/182040), Oct. 4, 2018, entire document (Year: 2018).*
International Search Report & Written Opinion issued Mar. 30, 2020 in PCT/US2020/013063, filed on Jan. 10, 2020, 8 pages.
Luhai, "Functional Materials for Printing and Packaging", China Light Industry Publishing house, 1$^{st}$ Edition, Jan. 31, 2013, p. 69 (total 3 pages).
Yunxing et al., "Handbook of Ink Technology (II)", Printing Industry Publishing House, 1$^{st}$ Edition, May 31, 2009, p. 886 (total 3 pages).
Xiuping, "Flexible Printing Technology", China Light Industry Press, 1$^{st}$ Edition, Apr. 30, 2003, p. 114 (3 pages).
Guide to Practical Ink Technology, 1st edition, Ling Yunxing et al. pp. 62-63, 68-70, Printing Industry Publishing House, Nov. 30, 2007. Relevancy statement is provided.

* cited by examiner

*Primary Examiner* — Lisa Solomon
(74) *Attorney, Agent, or Firm* — Oblon, McClelland, Maier & Neustadt, L.L.P.

(57) ABSTRACT

An aqueous energy curable inkjet ink, including (A) a non-photopolymerizable resin, (B) a water-soluble photopolymerizable monomer, (C) a pigment having an average particle size of 50 to 300 nm, and (D) at least 25 wt. % water, based on a total weight of the aqueous energy curable inkjet ink. The water-soluble photopolymerizable monomer (B) is a mixture of (B1) a mono-ethylenically unsaturated monomer and (B2) a poly-ethylenically unsaturated monomer.

18 Claims, No Drawings

AQUEOUS ENERGY CURABLE INKJET INKS

CROSS REFERENCE TO RELATED APPLICATIONS

This application is a National Stage entry under 35 U.S.C. § 371 of PCT/US2020/013063, filed on Jan. 10, 2020, incorporated herein by reference.

BACKGROUND OF THE INVENTION

Field of the Invention

The present invention relates to aqueous energy curable inkjet inks, specifically those that include (A) a non-photopolymerizable resin, (B) a water-soluble photopolymerizable monomer, (C) a pigment having an average particle size of 50 to 300 nm, and (D) water.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Inks formulated with volatile organic compounds (VOC) emit vapors and can pollute the environment. As a result of this and other concerns, efforts related to preparing inks that are environmentally friendly have shifted towards water-based inks. Traditionally, such water-based inks are made from the blend of a water-based polymeric binder (typically an acrylic latex) and a pigment (or colorant) dispersion in water. Evaporation of water from these inks then forms a film residue. However, drying of water-based inks is a slow process and adhesion is difficult on thin plastic films used for packaging and labeling.

To improve adhesion on such thin plastic films, inks may be formulated with energy curable (e.g., UV/EB) components (e.g., US 2013/0050366A1 and JP 2012097191—each incorporated herein by reference in its entirety). However, inks with too high a content of energy curable components can cause wrinkling and surface defects of the thin plastic films due to a high degree of shrinkage, once cured. Further, surface treatments of such thin plastic films in attempts to improve adhesion can also lead to surface defects. Such wrinkling/surface defects adversely affect adhesion and the image print quality.

In terms of curing inks formulated with energy curable (e.g., UV/EB) components, there is a trade-off between the curing speed and the flexibility of the resulting printed image, with desirable fast curing energy curable components resulting in printed images having unacceptable flexibility (printed image is too rigid and cracks when bent).

Therefore, in aqueous energy curable inkjet inks it is difficult to strike a balance between acceptable 1) drying speed, 2) print quality (related to shrinkage surface defects), 3) adhesion, 4) curing speed, and 5) printed image flexibility.

SUMMARY OF THE INVENTION

In view of the forgoing, there is a need for aqueous-based inkjet inks capable of providing fast drying and curing speeds without sacrificing print quality, adhesion, and printed image flexibility.

Accordingly, it is one object of the present disclosure to provide novel aqueous energy curable inkjet inks that meet these criteria.

It is another object of the present disclosure to provide novel printed articles which contain a dried and cured form of the aqueous energy curable inkjet inks.

It is another object of the present disclosure to provide novel methods of forming a printed image on a substrate by applying the aqueous energy curable inkjet inks onto the substrate, drying, and then curing.

These and other objects, which will become apparent during the following detailed description, have been achieved by the inventors' discovery that the combination of (A) a non-photopolymerizable resin, (B) a water-soluble photopolymerizable monomer, and (C) a pigment having an average particle size of 50 to 300 nm in (D) water provides fast drying and curing inks without adversely effecting printed image quality, adhesion, or flexibility.

Thus, the present invention provides:

(1) An aqueous energy curable inkjet ink, comprising:
   (A) a non-photopolymerizable resin;
   (B) a water-soluble photopolymerizable monomer;
   (C) a pigment having an average particle size of 50 to 300 nm; and
   (D) at least 25 wt. % water, based on a total weight of the aqueous energy curable inkjet ink.
(2) The aqueous energy curable inkjet ink of (1), wherein the non-photopolymerizable resin (A) is a polyvinylpyrrolidone, a poly(2-oxazoline), or a polyurethane-poly(meth)acrylate hybrid dispersion.
(3) The aqueous energy curable inkjet ink of (1) or (2), wherein the non-photopolymerizable resin (A) has a weight average molecular weight of 4,000 to 6,000 g/mol.
(4) The aqueous energy curable inkjet ink of any one of (1) to (3), wherein the non-photopolymerizable resin (A) is water-soluble and has a Hansen solubility parameter ($\delta$) of 23.0 to 27.0 MPa$^{1/2}$.
(5) The aqueous energy curable inkjet ink of any one of (1) to (4), wherein the non-photopolymerizable resin (A) is present in an amount of 0.1 to 10 wt. %, based on a total weight of the aqueous energy curable inkjet ink.
(6) The aqueous energy curable inkjet ink of any one of (1) to (5), wherein the water-soluble photopolymerizable monomer (B) is present in an amount of 30 to 70 wt. %, based on a total weight of the aqueous energy curable inkjet ink.
(7) The aqueous energy curable inkjet ink of any one of (1) to (6), wherein the water-soluble photopolymerizable monomer (B) comprises (poly)alkylene glycol functionality.
(8) The aqueous energy curable inkjet ink of any one of (1) to (7), wherein the water-soluble photopolymerizable monomer (B) is (B2) a poly-ethylenically unsaturated monomer or a mixture of (B1) a mono-ethylenically unsaturated monomer and (B2) a poly-ethylenically unsaturated monomer.
(9) The aqueous energy curable inkjet ink of any one of (1) to (8), wherein the pigment (C) is uncoated.
(10) The aqueous energy curable inkjet ink of any one of (1) to (9), wherein the pigment (C) is present in an amount of 0.1 to 10 wt. %, based on a total weight of the aqueous energy curable inkjet ink.
(11) The aqueous energy curable inkjet ink of any one of (1) to (10), further comprising (D1) an organic solvent.

(12) The aqueous energy curable inkjet ink of any one of (1) to (11), further comprising (E) a surfactant.
(13) The aqueous energy curable inkjet ink of any one of (1) to (12), further comprising (F) a photoinitiator.
(14) The aqueous energy curable inkjet ink of any one of (1) to (12), which is substantially free of (F) a photoinitiator.
(15) The aqueous energy curable inkjet ink of any one of (1) to (14), further comprising (G) a wax.
(16) The aqueous energy curable inkjet ink of (15), wherein the wax (G) is a polyolefin wax.
(17) The aqueous energy curable inkjet ink of any one of (1) to (16), further 20 comprising (H) a silane.
(18) A printed article, comprising:
a substrate and a dried and cured form of the aqueous energy curable inkjet ink of any one of (1) to (17) disposed on the substrate.
(19) A method of forming a printed image on a substrate, comprising:
applying the aqueous energy curable inkjet ink of any one of (1) to (17) onto the substrate with an inkjet printhead;
drying; and then curing the aqueous energy curable inkjet ink.
(20) The method of (19), wherein the aqueous energy curable inkjet ink is dried at a drying temperature of 50 to 70° C. for 1 to 2 minutes, which results in a weight loss of the aqueous energy curable inkjet ink of at least 25 wt. %, based on a total weight of the aqueous energy curable inkjet ink applied to the substrate.

The foregoing paragraphs have been provided by way of general introduction, and are not intended to limit the scope of the following claims. The described embodiments, together with further advantages, will be best understood by reference to the following detailed description.

DETAILED DESCRIPTION OF THE INVENTION

In the following description, it is understood that other embodiments may be utilized and structural and operational changes may be made without departure from the scope of the present embodiments disclosed herein.

The terms "curable" and "photopolymerizable" describe the ability of a material/composition to polymerize, harden, and/or cross-link in response to a suitable curing stimulus (energy source) such as actinic radiation, accelerated particle radiation, and thermal energy, for example, ultraviolet (UV) energy, radiation from the visible region of the spectrum, infrared (IR) energy, electron beam (EB) energy, heat energy, or other source of energy. The term "energy curable" is intended to cover all forms of curing upon exposure to an energy source, such as those described above, with specific mention being made to ultraviolet (UV) energy and electron beam (EB) energy.

As used herein, the term "cured" refers to a composition whereby curable/photopolymerizable components present in the composition have undergone polymerization, crosslinking, and/or hardening, through the formation of (1) chemical bonds, (2) mechanical bonds, or (3) a combination of a chemical and mechanical bonds, to form a polymerized or cross-linked network. The term "cured" is intended to include both "partially cured" compositions, whereby less than 50 wt. %, or less than 40 wt. %, or less than 30 wt. % or less than 20 wt. %, or less than 10 wt. %, or less than 5 wt. % of the curable/photopolymerizable functional groups present in the composition are polymerized and/or cross-linked, and "completely cured" compositions, whereby at least 50 wt. %, preferably at least 60 wt. %, preferably at least 70 wt. %0, preferably at least 80 wt. %, more preferably at least 90 wt. %, even more preferably at least 95 wt. %, yet even more preferably at least 99 wt. % of the curable/photopolymerizable functional groups present in the composition are polymerized and/or crosslinked. The degree of curing described above may be quantified by measuring percent reacted ethylenically unsaturated groups using Fourier Transform Infrared spectroscopy (FTIR).

As used herein, "ethylenically unsaturated" refers to groups containing a C=C which are curable/photopolymerizable such as (meth)acrylate, (meth)acrylamide, vinyl, allyl, and the like. Such ethylenically unsaturated groups may be present in materials classified as monomers, oligomers, and/or polymers, where a "monomer" is a compound whose molecules can join together to form oligomers or polymers, an "oligomer" is a polymeric compound containing relatively few repeated structural units (i.e., 2, 3, or 4 repeat units), and a "polymer" refers to a large molecule, or macromolecule, composed of many repeated structural units (i.e., 5 or more repeat units). Alkoxylated compounds are excluded from the definition of an oligomer or a polymer and are herein considered monomers unless indicated otherwise. For example, ethoxylated (15) trimethylolpropane triacrylate is considered a monomer herein.

As used herein, "mono-ethylenically unsaturated" refers to compounds/components which have one ethylenically unsaturated group per molecule, while "poly-ethylenically unsaturated" refers to those compounds/components having two or more (e.g., 2, 3, 4, 5, 6, 7, 8, etc.) ethylenically unsaturated groups per molecule. For example a "mono-ethylenically unsaturated monomer" refers to a monomeric material containing one ethylenically unsaturated group that may participate in curing when exposed to a curing stimulus.

The term "(meth)acrylate" is used herein to refer to both acrylate and methacrylate groups. In other words, this term should be read as through "meth" is optional. Further, "(meth)acrylate" is used generally to refer to both acrylic acid-based compounds and acrylic ester-based compounds.

As used herein, "alkoxylated" or "alkoxylate" refers to compounds containing a (poly)ether group (i.e., (poly)alkylene glycol) derived from reaction with, oligomerization of, or polymerization of one or more alkylene oxides having 2 to 4 carbon atoms, and specifically includes ethoxylated compounds ((poly)ethylene glycol containing compounds derived from reaction with ethylene oxide (EO)), propoxylated compounds ((poly)propylene glycol containing compounds derived from reaction with propylene oxide (PO)), and butoxylated compounds ((poly)butylene glycol containing compounds derived from reaction with butylene oxide (BO)), as well as mixtures thereof.

When referencing various inks/compositions herein, the phrase "substantially free", unless otherwise specified, describes an amount of a particular component (e.g., a photoinitiator) present in the ink/composition being less than about 1 wt. %, preferably less than about 0.5 wt. %, more preferably less than about 0.1 wt. %, even more preferably less than about 0.05 wt. %, yet even more preferably 0 wt. %, relative to a total weight of the ink/composition.

As used herein, the terms "optional" or "optionally" means that the subsequently described event(s) can or cannot occur or the subsequently described component(s) may or may not be present (e.g., 0 wt. %).

Unless otherwise specified, "water-soluble" refers to compounds/components having a solubility in water at 25°

C. of greater than or equal to 50 g/L (≥5 wt. %), including compounds/components which are freely soluble/miscible in water, while "water-insoluble" refers to compounds/components having a solubility in water at 25° C. of less than 50 g/L (<5 wt. %).

Aqueous Energy Curable Inkjet Inks

The present disclosure is directed to aqueous energy curable inkjet inks that possess/provide for acceptable 1) drying speed, 2) print quality, 3) adhesion, 4) curing speed, and 5) printed image flexibility.

The aqueous energy curable inkjet inks of the present disclosure generally include the following components: (A) a non-photopolymerizable resin, (B) a water-soluble photopolymerizable monomer, (C) a pigment having an average particle size of 50 to 300 nm, and (D) water, and optionally include (D1) an organic solvent, (E) a surfactant, (F) a photoinitiator, (G) a wax, (H) a silane, and (I) an additive (e.g., optical brightener, stabilizer, security taggant, etc.).

(A) Non-Photopolymerizable Resin

Resins employed in the disclosed aqueous energy curable inkjet inks are polymeric compounds, either homopolymers or copolymers, which are themselves non-photopolymerizable, and thus do not undergo any chemical changes when dried or subjected to an energy (curing) source (e.g. UV or EB source). Therefore, unlike photopolymerizable resins, non-photopolymerizable resins (A) result in film formation without shrinkage when subjected to an energy source. The use of non-photopolymerizable resins (A) thus provide the aqueous energy curable inkjet inks with desirable adhesion and print quality outcomes.

The non-photopolymerizable resin (A) may be present in the aqueous energy curable inkjet ink in an amount of up to 10 wt. %, for example, at least 0.1 wt. %, preferably at least 0.5 wt. %, more preferably at least 1 wt. %, even more preferably at least 1.5 wt. %, yet even more preferably at least 1.6 wt. %, and up to 10 wt. %, preferably up to 8 wt. %, preferably up to 6 wt. %, more preferably up to 4 wt. %, even more preferably up to 2 wt. %, yet even more preferably up to 1.8 wt. %, based on a total weight of the aqueous energy curable inkjet ink.

Non-photopolymerizable resins (A) suitable for use in the disclosed aqueous energy curable inkjet inks have a relatively low weight average molecular weight of up to 7,000 g/mol, for example, a weight average molecular weight of at least 3,000 g/mol, preferably at least 3,200 g/mol, preferably at least 3,400 g/mol, preferably at least 3,600 g/mol, preferably at least 3,800 g/mol, preferably at least 4,000 g/mol, and up to 7,000 g/mol, preferably up to 6,800 g/mol, preferably up to 6,600 g/mol, preferably up to 6,400 g/mol, preferably up to 6,200 g/mol, preferably up to 6,000 g/mol.

In some embodiments, the non-photopolymerizable resin (A) is water-soluble. For example, the non-photopolymerizable resin (A) may have a solubility in water at 25° C. of at least 50 g/L, preferably at least 75 g/L, preferably at least 100 g/L, preferably at least 150 g/L, preferably at least 200 g/L, preferably at least 250 g/L, preferably at least 300 g/L, preferably at least 350 g/L, more preferably at least 400 g/L, even more preferably at least 450 g/L, yet even more preferably at least 500 g/L. In some embodiments, the non-photopolymerizable resin (A) has a Hansen solubility parameter (δ in units of $MPa^{1/2}$) of at least 23.0, preferably at least 23.5, preferably at least 24.0, preferably at least 24.5, preferably at least 25.0, and up to 27.0, preferably up to 26.5, preferably up to 26.0, preferably up to 25.5.

Regarding non-photopolymerizable resins (A) which are water-soluble, specific mention is made to those formed from polymerization of a heterocyclic monomer. The non-photopolymerizable resin (A) may be formed from polymerization of a heterocyclic monomer containing a photopolymerizable group wherein the photopolymerizable group is polymerized and the heterocycle remains intact after polymerization (i.e., the non-photopolymerizable resin contains repeating heterocyclic units in which there are no remaining photopolymerizable groups), or the non-photopolymerizable resin (A) may be formed from ring-opening polymerization of a heterocyclic monomer wherein the non-photopolymerizable resin is substantially free of repeating heterocyclic units. The heterocyclic monomer may contain a 4-, 5-, 6-, or 7-membered monocyclic heterocyclic ring, preferably a 5-membered heterocyclic ring, which may be saturated, partially unsaturated, or fully unsaturated, and may contain carbon atoms and 1, 2, 3 or 4 heteroatoms independently selected from the group consisting of nitrogen (N), oxygen (O) and sulfur (S). Preferably, the non-photopolymerizable resin (A) is formed from polymerization of a heterocyclic monomer containing 2 heteroatoms, preferably of O and/or N, more preferably 2 heteroatoms of which one is N and one is O. In preferred embodiments, the non-photopolymerizable resin (A) is a polyvinylpyrrolidone and/or a poly(2-oxazoline).

<polyvinylpyrrolidone> In some embodiments, the non-photopolymerizable resin (A) is a homopolymer of polyvinylpyrrolidone (PVP), with specific mention being made to PVP K-12, available from Ashland. Low molecular weight (e.g., 3,000 to 7,000 g/mol) copolymers of polyvinylpyrrolidone may also be used herein, including, but not limited to, vinylpyrrolidone/vinyl acetate copolymers, vinylpyrrolidone/vinyl caprolactam copolymers, and vinylpyrrolidone/(meth)acrylate copolymers such as vinylpyrrolidone/dimethylaminoethylmethacrylate copolymers.

<poly(2-oxazoline)> In some embodiments, the non-photopolymerizable resin (A) is a poly(2-oxazoline), which may be formed from living cationic ring-opening polymerization of a 2-oxazoline. Preferably, the poly(2-oxazoline) is a poly(2-alkyl-2-oxazoline) (prepared from ring-opening of 2-alkyl-2-oxazoline), where the alkyl group is made up of hydrogen and anywhere from at least 1, preferably at least 2, more preferably at least 3 carbon atoms, and up to 6, preferably up to 5, more preferably up to 4 carbon atoms. Exemplary alkyl groups of poly(2-alkyl-2-oxazoline) may include, but is not limited to, methyl, ethyl, isopropyl, n-propyl, and cyclopropyl, preferably methyl and ethyl. The poly(2-oxazoline) useful herein may contain various α-end groups (those formed from initiating the living cationic ring-opening polymerization) and ω-end groups (those groups which terminate the living cationic ring-opening polymerization). For example, the poly(2-oxazoline) may have α-end groups including, but not limited to, hydrogen, methyl, allyl, propargyl, and benzyl, and w-end groups including, but not limited to, hydroxy, amino including unsubstituted amino groups ($-NH_2$) and substituted amino groups (e.g., 2-hydroxyethylamine, piperazine, etc.), azido, and thiol (—SH). In preferred embodiments, the poly(2-oxazoline) is a poly(2-ethyl-2-oxazoline) or a poly(2-methyl-2-oxazoline) containing any combination of end groups described above, more preferably a poly(2-ethyl-2-oxazoline) or poly(2-methyl-2-oxazoline) containing a hydrogen α-end group and a hydroxy ω-end group. AQUAZOL 5, which is a poly(2-ethyl-2-oxazoline) having a target molecular weight of 5,000 g/mol, available from Polymer Chemistry Innovations, Inc. as well as low molecular weight ULTROXA products, available from AVROXA, are specific examples of poly(2-oxazoline)s useful in the disclosed aqueous energy curable inkjet inks.

Alternatively, the non-photopolymerizable resin (A) may be dispersible in water. In some embodiments, the non-photopolymerizable resin (A) is a polyurethane-poly(meth)acrylate hybrid dispersion. The polyurethane-poly(meth)acrylate hybrid dispersion may be prepared by physical methods, whereby aqueous polyurethane and poly(meth)acrylate dispersions (emulsions) are independently prepared first and then mixed together under mechanical mixing. Alternatively, the polyurethane-poly(meth)acrylate hybrid dispersion may be prepared according to a chemical method, whereby a polyurethane dispersion is first prepared, and then (meth)acrylates (and optionally other vinyl monomers) are polymerized in the polyurethane dispersion, in some cases in a core-shell emulsion polymerization in which the polyurethane acts as seed particles and the (meth)acrylates (and optionally other vinyl monomers) are polymerized within the polyurethane particles.

The polyurethane portion of the polyurethane-poly(meth)acrylate hybrid dispersion may be a polymer or oligomer (pre-polymer) containing multiple urethane groups (—O—C(O)—NH—) formed from reaction between:

(i) a suitable polyisocyanate (organic compounds containing at least two isocyanate functionalities) such as an aliphatic, a cycloaliphatic and/or an aromatic polyisocyanate, with specific mention being made to butylene diisocyanate, hexamethylene diisocyanate (HDI), isophorone diisocyanate (IPDI), 3(4)-isocyanatomethyl-methylcyclohexyl isocyanate (IMCI), trimethylhexamethylene diisocyanate (2,2,4 and/or 2,4,4-trimethyl-hexamethylene diisocyanate), bis(4,4'-isocyanato-cyclohexyl)methane ($H_{12}MDI$), bis(isocyanate-methyl)-methylcyclohexane, 1,8-diisocyanatooctane, 1,4-cyclohexylene diisocyanate, 1,4-phenylene diisocyanate, 2,4- and/or 2,6-toluene diisocyanate (TDI), 1,5-naphthylene diisocyanate, 2,4'- and/or 4,4'-diphenylmethane diisocyanate (MDI), triphenylmethane-4,4',4"-triisocyanate, and the like; and (ii) a suitable polyol such as ethylene glycol, diethylene glycol, triethylene glycol, propylene glycol, dipropylene glycol, tripropylene glycol, 1,3-propanediol, butane diols (e.g., 1,2-, 1,3-, 1,4-butanediol), pentane diols (e.g., 1,5-pentanediol), hexane diols (e.g., 1,6-hexanediol), glycerin, 1,2,4-butanetriol, trimethylolethane, trimethylolpropane, di(trimethylolpropane), pentaerythritol, dipentaerythritol, pentane triols (e.g., 1,2,5-pentane triol), hexane triols (e.g., 1,2,6-hexanetriol), neopentyl glycol, mannitol, sorbitol, glucose, fructose, mannose, sucrose, specialty polyols (e.g., polycarbonate polyols, polycaprolactone polyols, polybutadiene polyols, polysulfide polyols, etc.), and the like, as well as alkoxylated adducts of any of the above-noted polyols.

As is well known to those of ordinary skill in the art, polyurethanes can contain additional groups such as urea, allophanate, biuret, carbodiimide, oxazolidinyl, isocyanurate, uretdione, ether, ester, carbonate, etc., in addition to urethane groups.

The poly(meth)acrylate portion of the polyurethane-poly(meth)acrylate hybrid dispersion may be formed from the polymerization of one or more (meth)acrylates such as alkyl (meth)acrylates (e.g., methyl (meth)acrylate, ethyl (meth)acrylate, butyl (meth)acrylate, 2-ethylhexyl (meth)acrylate, etc.) and hydroxyalkyl (meth)acrylates (including those containing one, two, three, or more hydroxyl groups). Such hydroxyalkyl (meth)acrylates may be prepared by reacting a polyol (a diol, a triol, etc.) such as ethylene glycol, propylene glycol, glycerol, trimethylol propane, hexane diol, pentaerythritol, and the like) with (meth)acrylic acid in amounts such that the resultant product contains one or more hydroxyl groups. Specific examples include, but are not limited to, hydroxyethyl (meth)acrylate, hydroxypropyl (meth)acrylate, hydroxybutyl (meth)acrylate, hydroxypropyl (meth)acrylate, hydroxyhexyl (meth)acrylate, 4-hydroxycyclohexyl(meth)acrylate, triglycerol di(meth)acrylate, dipentaerythritol penta(meth)acrylate, as well as alkoxylated adducts of any of the above. Copolymers of the above (meth)acrylate monomers are also included within the term "poly(meth)acrylate" as it appears herein. The polymerization of (meth)acrylate monomers to provide the polyurethane-poly(meth)acrylate hybrid dispersions useful in the aqueous energy curable inkjet inks may be accomplished by any polymerization technique known by those of ordinary skill in the art.

In some embodiments, the aqueous energy curable inkjet inks are substantially free of polyurethane resins, resins made of cellulose derivatives (e.g., carboxymethyl cellulose, cellulose esters such as cellulose acetate propionate), poly(meth)acrylate resins (acrylic resins), poly(meth)acrylamide resins, poly(vinyl acetate) resins, water-soluble epoxy resins, polyvinylalcohol resins, polyolefin resins, as well as resins which are made from any blend or copolymer thereof, including any blend or copolymer formed from one or more of the above with another polymer type not listed, as well as emulsions or dispersions thereof. Specific examples of such resins include, but are not limited to, JONCRYL 678, which is an acrylic resin having a weight average molecular weight of 8,500 g/mol available from BASF, AVICOR 2550, which is an acrylic emulsion available from Celanese, UNITIKA YA-4010 and UNITIKA SE-1030N, which are polyolefin emulsions available Unitika, DISPEX GA40, which is an acrylic copolymer available from BASF, and INDUPRINT SE 245, which is an emulsion polymer based on styrene and acrylates available from Indulor.

In some embodiments, the aqueous energy curable inkjet inks are substantially free of medium to high molecular weight (e.g., >7,000 g/mol) non-photopolymerizable resins such as polyvinylpyrrolidone homopolymers PVP K-15, PVP K-30, PVP K-60, PVP K-85, PVP K-90, and PVP K-120, each available from Ashland; vinylpyrrolidone/vinyl acetate copolymers such as LUVITEC VA 64P, LUVITEC VA 6535P, and LUVISKOL VA37E, each available from BASF, PVPNA E-535, PVP/VA 1-335, PVP/VA W-635, and PVPNA W-735, each available from Ashland; vinylpyrrolidone/vinyl caprolactam copolymers such as LUVITEC VPC 55K 65W, available from BASF; vinylpyrrolidone/(meth)acrylate copolymers such as vinylpyrrolidone/dimethylaminoethylmethacrylate copolymer, for example SOREZ HS-205, available from Ashland; and medium to high molecular weight poly(2-oxazolines) such as AQUAZOL 50, AQUAZOL 200, and AQUAZOL 500, available from Polymer Chemistry Innovations, Inc. For example, it has been found that acrylic resins such as acrylic homopolymers, acrylic copolymers (e.g., acrylic/styrene copolymers), and acrylic emulsions; polyolefin resins such as polyolefin emulsions; as well as other medium to high molecular weight non-photopolymerizable resins, such as those described above, tend to form aqueous energy curable inkjet inks which are not stable.

In preferred embodiments, the aqueous energy curable inkjet inks of the present disclosure are substantially free of photopolymerizable resins, that is, polymeric compounds which contain photopolymerizable groups, and thus undergo chemical changes (i.e., polymerization, crosslinking, etc.) when subjected to a curing source. For example, photopolymerizable resins may include, but are not limited to, energy curable polyurethanes such as (meth)acrylated polyurethane dispersions, such as those prepared from urethanization of a polyisocyanate, a polyol, and hydroxyalkyl (meth)acrylates, as described in JP2012097191 and EP2703459, each incorporated herein by reference in its entirety, with specific mention being made to UCECOAT 2801, UCECOAT 2804, UCECOAT 6558, UCECOAT 7177, UCECOAT 7655, UCECOAT 7710, each available from Allnex, NEORAD R441 available from Fitz Chem LLC., and BAYHYDROL UV2317 available from Covestro.

(B) Water-Soluble Photopolymerizable Monomer

The aqueous energy curable inkjet inks may be formulated with any photopolymerizable monomer(s) so long as it is water-soluble, i.e., has a solubility in water at 25° C. of at least 50 g/L, preferably at least 55 g/L, preferably at least 60 g/L, preferably at least 65 g/L, preferably at least 70 g/L, preferably at least 75 g/L, preferably at least 80 g/L, preferably at least 85 g/L, preferably at least 90 g/L, preferably at least 95 g/L, preferably at least 100 g/L, preferably at least 150 g/L, preferably at least 200 g/L, preferably at least 250 g/L, preferably at least 300 g/L, preferably at least 350 g/L, more preferably at least 400 g/L, even more preferably at least 450 g/L, yet even more preferably at least 500 g/L.

A total amount of the water-soluble photopolymerizable monomer (B) present in the aqueous energy curable inkjet inks may be anywhere from at least 30 wt. %, preferably at least 32 wt. %, preferably at least 34 wt. %, preferably at least 36 wt. %, preferably at least 38 wt. %, more preferably at least 40 wt. %, even more preferably at least 42 wt. %, yet even more preferably at least 44 wt. %, and up to 70 wt. %, preferably up to 68 wt. %, preferably up to 66 wt. %, preferably up to 64 wt. %, preferably up to 62 wt. %, preferably up to 60 wt. % preferably up to 58 wt. %, more preferably up to 56 wt. %, even more preferably up to 54 wt. %, yet even more preferably up to 52 wt. %, based on a total weight of the aqueous energy curable inkjet ink.

The water-soluble photopolymerizable monomer (B) may be (B1) a mono-ethylenically unsaturated monomer, (B2) a poly-ethylenically unsaturated monomer (di-ethylenically unsaturated, tri-ethylenically unsaturated, etc.), or a mixture thereof, preferably the aqueous energy curable inkjet inks are formulated with a poly-ethylenically unsaturated monomer (B2) or a mixture of a mono-ethylenically unsaturated monomer (B1) and a poly-ethylenically unsaturated monomer (B2). It is preferable, in terms of stability, that the water-soluble photopolymerizable monomer(s) (B) utilized herein contain (poly)ether functionality (i.e., (poly)alkylene glycol functionality), preferably (poly)ethylene glycol functionality.

The mono-ethylenically unsaturated monomer (B1) is a monomer containing a single ethylenically unsaturated (photopolymerizable) group, with the ethylenically unsaturated group being, for example, a (meth)acrylate group, a (meth)acrylamide group, a vinyl group, or an allyl group. In preferred embodiments, the mono-ethylenically unsaturated monomer (B1) is a mono(meth)acrylate monomer. Suitable examples of mono-ethylenically unsaturated monomers (B1) which are water-soluble and may be utilized herein include, but are not limited to, hydroxyalkyl mono(meth)acrylates such as hydroxyethyl(meth)acrylate, hydroxypropyl(meth)acrylate, and 2-hydroxy-3-phenyloxypropyl(meth)acrylate; mono(meth)acrylates containing (poly)alkylene glycol functionality, preferably (poly)ethylene glycol functionality, for example those which contain at least 2, preferably at least 4, preferably at least 6, preferably at least 8, more preferably at least 10, even more preferably at least 20, yet even more preferably at least 40 molar equivalents of an alkylene oxide (e.g., ethylene oxide) in reacted form, and up to 600, preferably up to 550, preferably up to 500, preferably up to 400, preferably up to 300, preferably up to 200, more preferably up to 100, even more preferably up to 80, yet even more preferably up to 60 molar equivalents of an alkylene oxide (e.g., ethylene oxide) in reacted form.

Specific examples of the mono-ethylenically unsaturated monomer (B1) include, but are not limited to, diethylene glycol methyl ether methacrylate (e.g., CD545), methoxy polyethylene glycol (550) monoacrylate monomer (e.g., CD553), alkoxylated tetrahydrofurfuryl acrylate (e.g., CD611), triethylene glycol ethyl ether methacrylate (e.g., CD730), 2-(2-ethoxyethoxy) ethyl acrylate (e.g., SR256), methoxy polyethylene glycol (350) monomethacrylate (e.g., SR550), and methoxy polyethylene glycol (350) monoacrylate (e.g., SR551), each available from Sartomer Co. Inc.; including combinations of two or more thereof. A preferred mono-ethylenically unsaturated monomer (B1) is methoxy polyethylene glycol (350) monoacrylate (e.g., SR551), available from Sartomer Co. Inc.

In preferred embodiments, the aqueous energy curable inkjet ink contains a mono-ethylenically unsaturated monomer (B1) in an amount of at least 10 wt. %, preferably at least 12 wt. %, more preferably at least 14 wt. %, even more preferably at least 16 wt. %, yet even more preferably at least 18 wt. %, and up to 30 wt. %, preferably up to 28 wt. %, preferably up to 26 wt. %, more preferably up to 24 wt. %, even more preferably up to 22 wt. %, yet even preferably up to 20 wt. %, based on a total weight of the aqueous energy curable inkjet ink.

The poly-ethylenically unsaturated monomer (B2) may be a di-ethylenically unsaturated monomer, a tri-ethylenically unsaturated monomer, or higher ethylenically unsaturated compounds (e.g., tetra-, penta-, etc. ethylenically unsaturated monomers), with the ethylenically unsaturated (photopolymerizable) groups being, for example, a (meth)acrylate group, a (meth)acrylamide group, a vinyl group, an allyl group, or a mixture thereof. Preferably, the poly-ethylenically unsaturated monomer (B2) contains at least one (meth)acrylate group, more preferably all ethylenically unsaturated groups are (meth)acrylate groups, even more preferably all ethylenically unsaturated groups are acrylate groups.

In some embodiments, the poly-ethylenically unsaturated monomer (B2) may be based on a polyol where two, three, four, or more of the hydroxyl groups of the polyol are functionalized with photopolymerizable groups (e.g., (meth)acrylate functional groups). Exemplary polyols include, but are not limited to, ethylene glycol, diethylene glycol, triethylene glycol, propylene glycol, dipropylene glycol, tripropylene glycol, 1,3-propanediol, butane diols (e.g., 1,2-, 1,3-, 1,4-butanediol), pentane diols (e.g., 1,5-pentanediol), hexane diols (e.g., 1,6-hexanediol), glycerin, 1,2,4-butanetriol, trimethylolethane, trimethylolpropane, di(trimethylolpropane), pentaerythritol, dipentaerythritol, pentane triols (e.g., 1,2,5-pentane triol), hexane triols (e.g., 1,2,6-hexanetriol), neopentyl glycol, mannitol, sorbitol, glucose, fructose, mannose, sucrose, and alkoxylated adducts of any of the above-noted polyols. In preferred embodiments, the poly-ethylenically unsaturated monomer (B2) contains (poly)ether functionality (i.e., (poly)alkylene glycol functionality), preferably (poly)ethylene glycol functionality, for example those which contain at least 2, preferably at least 5, preferably at least 10, preferably at least 20, more preferably at least 40, even more preferably at least 60, yet even more preferably at least 80 molar equivalents of an alkylene oxide (e.g., ethylene oxide) in reacted form, and up to 1,000, preferably up to 900, preferably up to 800, preferably up to 700, preferably up to 600, preferably up to 500, preferably up to 400, more preferably up to 300, even more preferably up to 200, yet even more preferably up to 100 molar equivalents of an alkylene oxide (e.g., ethylene oxide) in reacted form.

Suitable examples of di-ethylenically unsaturated monomers which are water-soluble and which may be utilized herein include, but are not limited to, tetraethylene glycol diacrylate, available from Sigma-Aldrich, polyethylene glycol (400) diacrylate (e.g., SR344), polyethylene glycol (600) diacrylate (e.g., SR610), polyethylene glycol (600) dimethacrylate (e.g., SR252), and polyethylene glycol (1000) dimethacrylate (e.g., SR740A), each available from Sartomer Co. Inc., including combinations of two or more thereof.

Suitable examples of tri-ethylenically unsaturated monomers which are water-soluble and which may be utilized herein include, but are not limited to, ethoxylated (6) trimethylolpropane triacrylate (e.g., SR499), ethoxylated (15) trimethylolpropane triacrylate (e.g., SR9035), and ethoxylated (20) trimethylolpropane triacrylate (e.g., SR415), each available from Sartomer Co. Inc., preferably ethoxylated (15) trimethylolpropane triacrylate (e.g., SR9035).

In preferred embodiments, the aqueous energy curable inkjet inks contain a poly-ethylenically unsaturated monomer (B2), preferably a tri-ethylenically unsaturated monomer, for example, in an amount of at least 20 wt. %, preferably at least 22 wt. %, preferably at least 24 wt. %, more preferably at least 26 wt. %, even more preferably at least 27 wt. %, yet even more preferably at least 28 wt. %, and up to 40 wt. %, preferably up to 38 wt. %, more preferably up to 36 wt. %/0, even more preferably up to 34 wt. %, yet even more preferably up to 32 wt. %, based on a total weight of the aqueous energy curable inkjet ink.

For a desirable balance between printed image flexibility and cure speed, the water-soluble photopolymerizable monomer (B) is preferably a mixture of a mono-ethylenically unsaturated monomer (B1) and a poly-ethylenically unsaturated monomer (B2). In some embodiments, a weight ratio of the poly-ethylenically unsaturated monomer (B2) to the mono-ethylenically unsaturated monomer (B1) is at least 0.45:1, preferably at least 0.5:1, preferably at least 0.6:1, preferably at least 0.7:1, preferably at least 0.8:1, preferably at least 0.9:1, preferably at least 1:1, preferably at least 1.1:1, preferably at least 1.2:1, more preferably at least 1.3:1, even more preferably at least 1.4:1, yet even more preferably at least 1.5:1, and up to 5:1, preferably up to 4:1, more preferably up to 3:1, even more preferably up to 2:1, yet even more preferably up to 1.6:1. In preferred embodiments, the poly-ethylenically unsaturated monomer (B2) is present in greater quantity than the mono-ethylenically unsaturated monomer (B1).

While in some cases inclusion of water-insoluble photopolymerizable monomers and/or photopolymerizable oligomers (either water-soluble or water-insoluble) may be acceptable, in preferred embodiments, the aqueous energy curable inkjet inks are substantially free of water-insoluble photopolymerizable monomers, photopolymerizable oligomers (either water-soluble or water-insoluble), or both.

(C) Pigment

The disclosed aqueous energy curable inkjet inks may be formulated to have any desirable color through appropriate selection of one or more pigments. It is to be readily appreciated by those of ordinary skill in the art that the aqueous energy curable inkjet inks are not limited to any particular color, and acceptable colors may include, but are not limited to, cyan, magenta, yellow, and key (black) ("CMYK"), white (including various shades of white such as pure white, eggshell, cream, ivory, etc.), red, blue, orange, green, light cyan, light magenta, and violet. In general, the pigment may be employed in amounts of at least 0.1 wt. % c, preferably at least 0.5 wt. %, more preferably at least 1 wt. %, even more preferably at least 2 wt. %, yet even more preferably at least 3 wt. %, and up to 20 wt. %, preferably up to 15 wt. %, more preferably up to 10 wt. %, even more preferably up to 8 wt. %, yet even more preferably up to 7 wt. % relative to the total weight of the aqueous energy curable inkjet inks.

The pigment utilized herein is generally of a size small enough that it can be reliably jetted from a printhead without substantially clogging print nozzles, capillaries, or other components of print equipment, and large enough so as not to increase the viscosity of the aqueous energy curable inkjet inks to an unacceptable level. The acceptable average particle size of the pigment may range from at least 50 nm, preferably at least 60 nm, preferably at least 70 nm, preferably at least 80 nm, preferably at least 85 nm, preferably at least 90 nm, preferably at least 100 nm, preferably at least 120 nm, preferably at least 140 nm, more preferably at least 160 nm, even more preferably at least 180 nm, yet even more preferably at least 200 nm, and up to 300 nm, preferably up to 280 nm, more preferably up to 260 nm, even more preferably up to 240 nm, yet even more preferably up to 220 nm. For example, when a white pigment is utilized, the white pigment may typically have an average particle size of 200 to 300 nm, and when a black or colored pigment is utilized, the black/colored pigment may typically have an average particle size of 100 to 200 nm. Commercial pigments may be used as obtained or may be ground and sieved to meet the desired particle size specifications. Laser diffraction and/or scanning electron microscopy methods may be used to measure the pigment particle sizes, for example.

In some embodiments, the pigment employed herein has a $D_{10}$ particle size (size in which 10% of particles are smaller and 90% of particles are larger) of at least 40 nm, preferably at least 50 nm, more preferably at least 60 nm, even more preferably at least 70 nm, and up to 100 nm, preferably up to 90 nm, more preferably up to 80 nm, even more preferably up to 75 nm. In preferred embodiments, the disclosed aqueous energy curable inkjet inks do not contain any pigments having a particle size of less than 85 nm, preferably less than 80 nm, preferably less than 70 nm, preferably less than 60 nm, preferably less than 50 nm, preferably less than 45 nm, more preferably less than 40 nm, even more preferably less than 35 nm, yet even more preferably less than 30 nm.

Preferred pigments of the present disclosure are uncoated, for example, are pigments which are not coated with an organic coating such as a resin, e.g., those resin coatings described in US 2013/0050366 A1—incorporated herein by reference in its entirety, or an inorganic coating such as silica, alumina, alumina-silica, boric acid, and zirconia coatings.

Specific examples of pigments which may be used herein include, but are not limited to, colored pigments such as PALIOGEN Violet 5100 (available from BASF), HELIOGEN Green L8730 (available from BASF), SUNFAST Blue 15:3 and 15:4 (available from Sun Chemical), LITHOL Fast Scarlet L4300 (available from BASF), SUNBRITE orange, red, and yellow pigments (available from Sun Chemical), HELIOGEN Blue L6900 (available from BASF), PALIOGEN Blue L6470 (available from BASF), NOVO PERM Yellow FGL (available from Clariant), Ink Jet Yellow 4G (available from Clariant), and CINQUASIA Magenta D4535 (available from BASF); black pigments and carbon blacks such as PALIOGEN Black L0086 (available from BASF), REGAL 330 (available from Cabot), MOGUL L and REGAL 400R (available from Cabot), and carbon black PBL 7 (available from Cabot); white pigments such as pigment white 1 (lead hydroxide carbonate), pigment white 3 (lead sulfate), pigment white 4 (zinc oxide), pigment white 5 (lithopone), pigment white 6 (titanium dioxide), pigment white 7 (zinc sulfide), pigment white 10 (barium carbonate), pigment white 11 (antimony trioxide), pigment white 12 (zirconium oxide), pigment white 14 (bismuth oxychloride), pigment white 17 (bismuth subnitrate), pigment white 18 (calcium carbonate), pigment white 19 (kaolin), pigment white 21 (barium sulfate), pigment white 24 (aluminum hydroxide), pigment white 25 (calcium sulfate), pigment white 27 (silicon dioxide), pigment white 28 (calcium metasilicate), and pigment white 32 (zinc phosphate cement); as well as mixtures thereof.

Solvent System

Water (D) is present in the disclosed aqueous energy curable inkjet inks. Typically water is present in an amount of at least 25 wt. %, preferably at least 27 wt. %, preferably at least 29 wt. %, more preferably at least 30 wt. %, even more preferably at least 32 wt. %, yet even more preferably at least 34 wt. %, and up to 55 wt. %, preferably up to 50 wt. %, preferably up to 45 wt. %, preferably up to 42 wt. %, more preferably up to 40 wt. %, even more preferably up to 38 wt. %, yet even more preferably up to 36 wt. %, based on a total weight of the aqueous energy curable inkjet inks. It is preferred that water (D) constitutes all or a majority of the solvent system used in the aqueous energy curable inkjet inks herein.

Compatible organic solvent(s) (D1) may be optionally employed in the aqueous energy curable inkjet ink. The inclusion of one or more organic solvents (D1) may aid solvation of certain components and provide the aqueous energy curable inkjet ink with acceptable volatility for the purposes of improved dry times. In some embodiments, the organic solvent (D1) is present in the aqueous energy curable inkjet inks in an amount of at least 0.1 wt. %, preferably at least 0.5 wt. %, more preferably at least 1 wt. %, even more preferably at least 2 wt. %, yet even more preferably at least 3 wt. %, and up to up to 20 wt. %, preferably up to 18 wt. %, preferably up to 15 wt. %, more preferably up to 13 wt. %, even more preferably up to 11 wt. %, yet even more preferably up to 10 wt. %, based on a total weight of the aqueous energy curable inkjet inks.

Exemplary organic solvents (D1) include, but are not limited to:
  lower alcohols containing from 1 to 8 carbon atoms, such as methanol, ethanol, 1-propanol, 2-propanol, 1-butanol, 2-butanol;
  glycols such as ethylene glycol, diethylene glycol, triethylene glycol, tetraethylene glycol, propylene glycol, dipropylene glycol;
  glycol ethers such as ethylene glycol monomethyl ether, ethylene glycol monoethyl ether, ethylene glycol monobutyl ether, diethylene glycol monomethyl ether, diethylene glycol monoethyl ether, diethylene glycol mono-n-propyl ether, ethylene glycol mono-isopropyl ether, diethylene glycol mono-isopropyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-isopropyl ether, propylene glycol mono-n-butyl ether, dipropylene glycol mono-n-butyl ether, dipropylene glycol monomethyl ether, dipropylene glycol monoethyl ether, dipropylene glycol mono-n-propyl ether, and dipropylene glycol mono-isopropyl ether;
  ethers (non-glycol ethers), for example ethers containing 4 to 8 carbon atoms such as diethyl ether, dipropyl ether, methyl tert-butyl ether, dibutyl ether, dioxane, and tetrahydrofuran;
  ketones, for example ketones containing 3 to 6 carbon atoms, including acetone, methyl ethyl ketone, 3-pentanone, cyclohexanone, and diacetone alcohol;
  esters, including those having 3 to 8 carbon atoms, for example methyl acetate, ethyl acetate, n-butyl acetate, methyl lactate, ethyl lactate, butyl lactate, methoxyethyl acetate, ethoxyethyl acetate, methoxypropyl acetate, ethoxypropyl acetate;
  as well as mixtures thereof.

In preferred embodiments, when an organic solvent (D1) is employed, the organic solvent is preferably a glycol, preferably propylene glycol.

(E) Surfactant

The aqueous energy curable inkjet inks herein may be optionally formulated with a surfactant (E), for example, to lower the surface tension of the inks and/or to aid wetting and leveling of the substrate surface, if necessary, before drying/curing. The inclusion of a surfactant (E) is optional, but when included, is used in an amount of from 0.001 wt. %, preferably from 0.005 wt. %, more preferably from 0.1 wt. %, even more preferably from 1 wt. %, and up to 5 wt. %, preferably up to 4 wt. %, preferably up to 3 wt. %, more preferably up to 2 wt. %, even more preferably up to 1.5 wt. %, based on the total weight of the aqueous energy curable inkjet ink.

The surfactant (E) can be selected by both its hydrophobic and hydrophilic properties, and can be, but does not need to be soluble in water. The surfactant (E) may optionally contain photopolymerizable groups which allow it to cross-link or otherwise become part of the cured ink network. Acceptable surfactants (E) may include, but are not limited to, polysiloxanes, fluorine containing polymers, gemini surfactants, as well as copolymers thereof, combinations thereof, and multifunctional surfactants thereof containing more than one type of surfactant covalently bonded together, such as copolymers or multifunctional surfactants made from one of the above surfactant types with poly(meth) acrylates, polyethers, etc.

Specific examples may include, but are not limited to, polyether siloxane copolymers such as SILTECH C-20, C-42, C-101, C-241, C-442, and C-468, available from Siltech Corporation, and BYK-333 and 377, available from available from Byk Chemie; organomodified silicones (e.g., alkyl and/or aryl modified silicones) such as SILTECH C-32, available from Siltech Corporation, and COATOSIL 1211C and 3573, available from Momentive; photo-crosslinkable silicone acrylates or silicone polyether acrylates such as TEGO Rad 2100, Rad 2200, Rad 2250, Rad 2300, available from Evonik Industries, and BYK-UV 3500 and 3530, available from Byk Chemie; polyacrylates such as BYK-381 and 361N, available from Byk Chemie; fluoropolymers such as FC-4430 and FC-4432, available from 3M Corporation; acetylenic diol and acetylenic glycol-based gemini surfactants such as SURFYNOL and DYNOL surfactants, available from Evonik Industries; polysiloxane-based gemini surfactants such as TEGO Twin 4100, available from Evonik Industries; and mixtures thereof.

In preferred embodiments, the surfactant (E) is a gemini surfactant, preferably a siloxane-based gemini surfactant, with specific mention being made to TEGO Twin 4100, available from Evonik Industries.

(F) Photoinitiator

The aqueous energy curable inkjet inks may be optionally formulated for curing with accelerated particle radiation (e.g., electron beam curing), and thus the use of photoinitiators is not required. When designed to be cured with an accelerated particle curing stimulus such as EB curing, the aqueous energy curable inkjet inks may include, but are preferably substantially free of photoinitiator(s) (F), more preferably completely free of photoinitiator(s) (F) (e.g., 0 wt. %).

When the aqueous energy curable inkjet inks will be subject to an actinic curing stimulus such as UV energy, the use of a photoinitiator(s) (F) may be required for a sufficient cure. Therefore, the aqueous energy curable inkjet inks may contain a photoinitiator (F), as needed, in amounts of up to 5 wt. % of a photoinitiator (F), for example, at least 0.05 wt. %, preferably at least 0.1 wt. %, preferably at least 0.2 wt. %, preferably at least 0.4 wt. %, more preferably at least 0.6 wt. %, even more preferably at least 0.8 wt. %, yet even more preferably at least 1 wt. %, and up to 5 wt. %, preferably up to 4 wt. %, preferably up to 3 wt. %, more preferably up to 2.5 wt. %, even more preferably up to 2 wt. %, yet even more preferably up to 1.5 wt. %, based on a total weight of the aqueous energy curable inkjet inks.

Any photoinitiator (F) that provides a suitable cure may be optionally employed herein, including those which are water-soluble or those which are water-insoluble. When referencing photoinitiators (F) in the present disclosure, "water-soluble" refers to those which have a solubility in water at 25° C. of at least 5.0 g/L, while "water-insoluble" refers to those which have a solubility in water at 25° C. of less than 5.0 g/L. Suitable examples of photoinitiators that may be used include, but are not limited to:

α-hydroxyketones such as 1-[4-(2-hydroxyethoxyl)-phenyl]-2-hydroxy-2-methylpropanone (e.g., OMNIRAD 2959, formerly Irgacure 2959, available from IGM resins), 1-hydroxycyclohexylphenyl ketone (e.g., GENOCURE CPK, available from Rahn), and 1-phenyl-2-hydroxy-2-methyl propanone (e.g., OMNIRAD 73, available from IGM resins);

benzoyl phosphinates such as ethyl(2,4,6-trimethylbenzoyl)-phenyl phosphinate (e.g., OMNIRAD TPO-L, available from IGM resins);

acyl and bis-acyl phosphine oxides such as phenylbis(2,4,6-trimethylbenzoyl)phosphine oxide (e.g., OMNIRAD 819, available from IGM resins), 2,4,6-trimethylbenzoyl-diphenyl-phosphine oxide (e.g., GENOCURE TPO, available from Rahn), and bis(2,6-dimethoxybenzoyl)-2,4,4-trimethylpentyl phosphine oxide;

alkylphenones such as 2-benzyl-2-(dimethylamino)-4'-morpholinobutyrophenone (e.g., GENOCURE BDMM, available from Rahn), 2-hydroxy-2-methyl-propiophenone, 2,2-dimethyl-2-hydroxy-acetophenone, 2,2-dimethoxy-2-phenylacetophenone (e.g., OMNIRAD BDK, available from IGM resins), and 2-methyl-1-[4-(methylthio)phenyl]-2-morpholino-propan-1-one;

benzophenones such as trimethylbenzophenone and methylbenzophenone;

phenylglyoxylates such as oxy-phenyl-acetic acid 2-[2-oxo-2-phenyl-acetoxy-ethoxy]-ethyl ester and oxyphenyl acetic acid 2-[2-hydroxy-ethoxy]-ethyl ester (e.g., OMNIRAD 754, available from IGM resins; and combinations thereof.

In preferred embodiments, the photoinitiator (F) is water-soluble, more preferably is a water-soluble α-hydroxyketone, with specific mention being made to OMNIRAD 2959, available from IGM resins.

(G) Wax

The aqueous energy curable inkjet inks herein may be optionally formulated with a wax (G), for example, to improve various properties related to the handling of printed articles made using the aqueous energy curable inkjet inks, such as slip or lubrication, rub, scratch, or abrasion resistance, and anti-blocking (stackability). The inclusion of a wax (G) is optional, but when included, the wax (G) may be used in an amount of at least 0.05 wt. %, preferably at least 0.1 wt. %, preferably at least 0.2 wt. %, preferably at least 0.4 wt. %, more preferably at least 0.6 wt. %0, even more preferably at least 0.8 wt. %, yet even more preferably at least 1 wt. %, and up to 10 wt. %, preferably up to 8 wt. %, preferably up to 6 wt. %, more preferably up to 5 wt. %, even more preferably up to 4 wt. %/0, yet even more preferably up to 3 wt. %, based on a total weight of the aqueous energy curable inkjet inks.

The wax (G) may be a plant and animal-based wax such as candeli wax, beeswax, rice wax, and lanolin; a petroleum-based wax such as paraffin wax, microcrystalline wax, polyethylene wax, polyethylene oxide wax, and petrolatum; a mineral-based wax such as montan wax and ozocerite; a synthesized wax such as carbon wax, Hoechst wax, polyolefin wax, and stearic acid amide (e.g., ethylene bis(stearamide)) wax, including synthesized copolymeric waxes such as α-olefin maleic anhydride copolymers; and the like as well as dispersions/emulsions of any of the above waxes. Although the wax (G) may meet the definition of a non-photopolymerizable resin (A), the wax (G) is considered to be a separate and distinct component/material in the present disclosure, at least because of the different properties of waxes compared to non-waxy polymers, such as gradual (ill-defined) melting points.

The preferred wax (G) of the present disclosure is polyolefin wax (synthesized). Preferably, the polyolefin wax is completely non-polar and linear polyolefin wax which is unmodified (e.g., not oxidized, acid-modified, or modified with a specialty monomer) and which has a narrow molecular weight distribution. Particularly preferred waxes (G) are those which are polyolefin wax emulsions. The polyolefin wax may be micronized, for example, having a $D_{50}$ particle size of at least 1 μm, preferably at least 2 μm, preferably at least 3 μm, more preferably at least 4 μm, even more preferably at least 5 μm, yet even more preferably at least 5.5 μm, and up to 50 μm, preferably up to 40 μm, preferably up to 30 μm, preferably up to 20 μm, preferably up to 15 μm, preferably up to 12.5 μm, more preferably up to 10 μm, even more preferably up to 8 μm, yet even more preferably up to 6 μm.

Suitable examples of the polyolefin wax include, but are not limited to, polyethylene wax, preferably a high density polyethylene wax, more preferably a micronized high density polyethylene wax; and a polypropylene wax, preferably a metallocene-based polypropylene wax, more preferably a micronized metallocene-based polypropylene wax, with specific mention being made to JCCL-PE wax, made by Kao Corp. Japan, which is in turn made from HYTEC-E-6500 (polyethylene wax, available from TOHO Chemical Industry, Co.), CERIDUST 3610 (a micronized high density polyethylene wax), and CERIDUST 6050M (a micronized metallocene-based polypropylene wax), each available from Clariant.

It has been found that the polyolefin waxes described above, when incorporated into the aqueous energy curable inkjet inks, produce printed images with advantageous handling related properties while not disturbing the stability of the aqueous energy curable inkjet inks themselves. On the other hand, other types of synthetic waxes such as polytetrafluoroethylene (Teflon) waxes (e.g., NANOFLON 119N, available from Shamrock) and other types of plant and animal-based waxes such as carnauba waxes (e.g., CERASPERSE UV 636, formerly EVERGLIDE UV 636, which is carnauba wax dispersed in the UV monomer tri(propylene glycol) diacrylate, available from Shamrock) cause ink instability and result in separation of the inks into layers soon after mixing.

(H) Silane

One or more silanes (H) may be optionally included in the aqueous energy curable inkjet inks, for example to function as adhesion promoters. Useful silanes (H) are those which have multiple reactive sites (multi-functional) capable of reacting with organic functionalities found on the various components in the aqueous energy curable inkjet inks as well as the substrate, for example to promote crosslinking and/or adhesion of the ink components to the substrate.

The silane (H) may be a small molecule silane containing at least 1 reactive silane group or a silane oligomer (partially hydrolyzed and condensed silane containing relatively few repeating units) containing at least 3 reactive silane groups. For example, the silane (H) may contain up to 6, preferably up to 5, preferably up to 4, preferably up to 3 reactive silane groups. The reactive silane group(s) present in the silane (H) may be any which have at least one hydrolyzable group bonded directly to a Si atom. Hydrolyzable groups include, but are not limited to, alkoxy groups (e.g., methoxy, ethoxy, propoxy, isopropoxy, t-butoxy, as well as substituted variants, as well as mixtures of one or more of these groups) and halo groups (e.g., chloro, bromo), including mixtures of alkoxy and halo groups. Each reactive silane group may therefore have one, two, or three hydrolyzable groups, which may be the same or different, preferably the same, more preferably each hydrolyzable group present is a methoxy.

The silane (H) may be multi-functional of a singular type and contain a plurality of reactive silane groups, which are the only groups capable of reacting with organic functionalities found in the aqueous energy curable inkjet inks/substrate. For example, the silane (H) may be a isocyanurate containing silane, preferably a tris(3-(trialkoxysilyl)alkyl) isocyanurate (e.g., such as those described in U.S. Pat. No. 9,617,454B2—incorporated herein by reference in its entirety), more preferably a tris(3-(trimethoxysilyl)alkyl) isocyanurate, even more preferably a tris(3-(trimethoxysilyl)propyl) isocyanurate (e.g., SILQUEST A-LINK 597, available from Momentive).

Alternatively, the silane (H) may be mixed multi-functional and contain one or more reactive silane groups in addition to one or more other types of reactive sites which are capable of reacting with organic functionalities found on the various components in the aqueous energy curable inkjet inks as well as the substrate. For example, the silane (H) may be an epoxy functional silane (containing reactive silane group(s) and reactive epoxy group(s)). In particular, the silane (H) may be an epoxyalkyltrialkoxy silane, preferably an epoxyalkyltrimethoxy silane; a glycidoxyalkyltrialkoxy silane, preferably a glycidoxyalkyltrimethoxy silane; or an epoxy functional (alkoxy)silane oligomer, preferably a glycidoxyalkyl(alkoxy)silane oligomer, more preferably a glycidoxyalkyl(methoxy)silane oligomer; with specific mention being made to SILQUEST A-186 (beta-(3,4-epoxycyclohexyl)ethyltrimethoxysilane), SILQUEST A-187 (gamma-glycidoxypropyltrimethoxysilane), and COATOSIL MP 200 silane (a gamma-glycidoxypropyl (methoxy)silane oligomer), each available from Momentive.

Generally, if present, the amount of silane (H) employed in the aqueous energy curable inkjet ink ranges from at least 0.05 wt. %, preferably at least 0.1 wt. %, preferably at least 0.2 wt. %, preferably at least 0.4 wt. %, more preferably at least 0.6 wt. %, even more preferably at least 0.8 wt. %, yet even more preferably at least 1 wt. %, and up to 5 wt. %, preferably up to 4 wt. %, more preferably up to 3 wt. %, even more preferably up to 2 wt. %, yet even more preferably up to 1.5 wt. %, based on a total weight of the aqueous energy curable inkjet inks.

(I) Additives

The aqueous energy curable inkjet inks of the present disclosure may also be optionally formulated with various additives to improve various ink characteristics and performance. For example, the aqueous energy curable inkjet inks may optionally contain one or more of an optical brightener, a stabilizer, a security taggant, a humectant, a photosensitizer, a fungicide, a pH adjusting agent, an anti-fading agent, or any other ink additive known to be used in water-based ink systems.

Each additive may be optionally included in art recognized usage amounts, for example, each additive may be added in an amount of from 0.0001 wt. %, preferably from 0.001 wt. %, preferably from 0.01 wt. %, preferably from 0.1 wt. %, more preferably from 0.5 wt. %, even more preferably from 1 wt. %, yet even more preferably from 2 wt. %, and up to 10 wt. %, preferably up to 9 wt. %, preferably up to 8 wt. %, preferably up to 7 wt. %, preferably up to 6 wt. %, more preferably up to 5 wt. %, even more preferably up to 4 wt. %, yet even more preferably up to 3 wt. %, based on a total weight of the aqueous energy curable inkjet inks.

Properties

The aqueous energy curable inkjet inks disclosed herein generally have a viscosity (in centipoise, cP) at 25° C. of at least 5 cP, preferably at least 6 cP, preferably at least 8 cP, preferably at least 10 cP, preferably at least 12 cP, preferably at least 14 cP, preferably at least 16 cP, preferably at least 18 cP, and up to 35 cP, preferably up to 33 cP, preferably up to 30 cP, preferably up to 28 cP, preferably up to 26 cP, preferably up to 24 cP, preferably up to 22 cP, preferably up to 20 cP. The viscosity may be measured using, for example, a Rheometrics Fluid Rheometer RFS3, ARES rheometer, both made by Rheometrics, a division of TA Instruments, or a Haake Roto Visco 1 rheometer, Brookfield DV-E Viscometer made by AMETEK Brookfield and a TCP/P-Peltier Temperature Control Unit.

Adhesion can be measured by a cross hatch adhesion tape test according to ASTM D3359-09—which is incorporated herein by reference in its entirety, and quantified on a OB to 5B scale according to this standard. The aqueous energy curable inkjet inks disclosed herein provide advantageous adhesion properties on a variety of substrates, with adhesion performance ratings of 3B or higher, preferably 4B or higher, more preferably 5B.

Print quality can be determined through simple visual inspection of the printed images or by using image clarity software known by those of ordinary skill in the art, for example, Personal Image Analysis System (PIAS) software.

The drying speed of the aqueous energy curable inkjet inks can be measured according to the Examples described hereinafter, as the amount of water or other volatile components lost (in mg) per area of coverage under applied heat within a specific time (units of mg/cm$^2 \cdot$s), for example by weighing a substrate, a fresh sample (the substrate having newly applied aqueous energy curable inkjet ink), drying at 60° C. for two minutes, then re-weighing the dried sample to determine the weight loss of the aqueous energy curable inkjet inks after accounting for the weight of the substrate. The drying speed results may be expressed in terms of weight loss by subtracting a percentage of the dried aqueous energy curable inkjet ink relative to the starting weight of the newly applied aqueous energy curable inkjet ink from 100, and categorized as: 3—Fail, slow drying (0 to <25% weight loss); 2—Pass, acceptable drying (25 to 35% weight loss); 1—Pass, fast drying (>35% weight loss). The aqueous energy curable inkjet inks herein have acceptable (2) or fast (1) drying speeds, preferably fast (1) drying speeds.

The curing speed of the aqueous energy curable inkjet inks can be measured according to the Examples described hereinafter in terms of the surface condition (tack) of the inks after being subjected to (i) UV or (ii) EB curing conditions. For testing curing speeds, the aqueous energy curable inkjet inks may be subject to (i) UV cure conditions with a UV fluence (dose) of 1,000 mJ/cm$^2$ using a H-type UV bulb, or (ii) EB cure conditions with a 3.5 Mrad dose of electron beam radiation using an electron beam generator, e.g., available from Electron Crosslinking AB (Sweden), Comet AG (Switzerland) or Energy Sciences, Inc. (ESI) (USA). The surface condition (tack) of the cured inks may then be determined using touch, or alternatively, using tack measurements according to International Standard ISO 12634—which is incorporated herein by reference in its entirety, and the inks categorized as: 3—Fail, slow curing (Tacky, tack does not fade over time, ink can be rubbed off); 2—Pass, acceptable curing (Slight tack, tack fades over time); 1—Pass, fast curing (No tack). The aqueous energy curable inkjet inks herein have acceptable (2) or fast (1) curing speeds, preferably fast (1) curing speeds.

Method of Making

Embodiments of the aqueous energy curable inkjet inks described herein may be prepared by any suitable technique known to those of ordinary skill in the art, for example by combining the non-photopolymerizable resin (A), the water-soluble photopolymerizable monomer (B), and water (D), and any desired optional ingredient (e.g., the organic solvent (D1), the surfactant (E), the photoinitiator (F), the wax (G), the silane (H), and the additive (I) (e.g., optical brightener, stabilizer, security taggant, etc.)) and agitating (e.g., stirring, sonicating, shaking) at a temperature between 20 and 45° C. until a uniform dispersion is formed. Then, the pigment having an average particle size of 50 to 300 nm (B) may be added, and the resulting mixture agitated (e.g., stirring, sonicating, shaking) at a temperature between 20 and 45° C. until a uniform dispersion is formed.

Printed Article

The aqueous energy curable inkjet inks can be printed on various substrates including three dimensional parts as well as flat sheets or webs that are supplied in roll form, for the manufacture of a wide variety of printed articles. Additionally, the substrates may possess various surface types, for example, a flat surface, a structured surface, such as grained surfaces, and a three-dimensional surface, such as curved and/or complex surfaces, which are notoriously difficult substrates owing to the long distance that the ink must travel to reach all parts of the curved and/or complex surface. Such printed articles may be suitable in the graphic arts, textiles, packaging (e.g., food packaging, pharmaceutical packaging, etc.), lottery, business forms and publishing industries, examples of which include a tag or label, a lottery ticket, a publication, packaging (e.g., flexible packaging), a folding carton, a rigid container (e.g., a plastic cup or tub, glass containers, metal cans, bottles, jars, and tubes), a point-of-sale display, and the like. Particularly preferred printed articles are those used for packaging, for example, thin plastic films (e.g., flexible packaging), preferably food/product packaging (e.g., primary, secondary, or tertiary food packaging) which may contain food products, non-food products, pharmaceutical, and/or personal care items.

The aqueous energy curable inkjet inks may be printed on porous or penetrable substrates, examples of which include, but are not limited to, non-coated paper, wood, membranes, and fabrics (including, for example, but not limited to, woven fabric, non-woven fabric, and foil-laminated fabric).

The aqueous energy curable inkjet inks may also be printed on non-porous or non-penetrable substrates, for example, various plastics, glass, metals (e.g., steel, aluminum, etc.), and/or non-penetration papers (e.g., coated papers). These may include, but are not limited to, molded plastic parts as well as flat sheets or rolls of plastic films. Examples include those containing polyesters such as polyethylene terephthalate (PET), biaxially oriented polystyrene (OPS), polyolefins such as polyethylene (PE), polypropylene (PP), and oriented polypropylene (OPP), polylactic acid (PLA), nylon and oriented nylon, polyvinyl chloride (PVC), cellulose triacetate (TAC), polycarbonate, acrylonitrile butadiene styrene (ABS), polyacetal, polyvinyl alcohol (PVA), and the like.

Method of Forming a Printed Image

The present disclosure provides a method of forming a printed image on a substrate by applying the aqueous energy curable inkjet inks, in one or more of its embodiments, onto a surface of the substrate with an inkjet printhead, drying, followed by curing the aqueous energy curable inkjet ink. Use of the aqueous energy curable inkjet inks described herein overcomes the problems common to aqueous ink systems by providing advantageous 1) drying speed, 2) print quality (related to shrinkage surface defects), 3) adhesion, 4) curing speed, and 5) printed image flexibility.

Any drop-on-demand printhead known to those of ordinary skill in the art of inkjet printing can be used to apply the aqueous energy curable inkjet inks in the present method. Typical parameters, such as, for example, printing resolution, printing speed, printhead and ink temperature, driving voltage and pulse width, can be adjusted according to the specifications of the inkjet printhead. Inkjet printheads which are generally suitable for usage in the methods herein have a droplet size in the range of 2 to 80 pL and a droplet frequency in the range of 10 to 100 kHz, and high quality prints may be obtained, for example.

After application onto the substrate, the aqueous energy curable inkjet ink is dried. Preferably, the aqueous energy curable inkjet ink is dried using external heat, IR or n-IR, for example, using a heater such as a heating element (e.g., nichrome wire heater), a heat lamp, a warm/hot air heating device, etc., to facilitate drying and/or to increase drying speeds of the applied energy curable inkjet ink. The aqueous energy curable inkjet ink may be dried under a variety of conditions depending on the particular substrate, the amount of ink applied, etc., but typically is dried under conditions suitable to cause a weight loss (due to evaporation) of at least 25 wt. %, preferably at least 30 wt. %, more preferably at least 35 wt. %, even more preferably at least 40 wt. %, yet even more preferably at least 45 wt. %, and up to 60 wt. %, preferably up to 55 wt. %, more preferably up to 50 wt. %, relative to a starting weight of the applied aqueous energy curable inkjet ink.

For example, the aqueous energy curable inkjet ink may be dried at a drying temperature of at least 35° C., preferably at least 40° C., preferably at least 45° C., more preferably at least 50° C., even more preferably at least 55° C., yet even more preferably at least 60° C., and up to 100° C., preferably up to 90° C., preferably up to 80° C., more preferably up to 75° C., even more preferably up to 70° C., yet even more preferably up to 65° C., and for a duration of up to 10 minutes, for example at least 0.5 minutes, preferably at least 1 minutes, more preferably at least 1.5 minutes, even more preferably at least 2 minutes, and up to 10 minutes, preferably up to 8 minutes, more preferably up to 6 minutes, even more preferably up to 4 minutes, yet even more preferably up to 3 minutes.

After being dried to an acceptable degree, the aqueous energy curable inkjet ink is cured. Any curing stimulus may be utilized, although the use of ultraviolet (UV) energy and/or electron beam (EB) energy is preferred. Regardless of which curing stimulus is used, the energy source may be located in-line and directly downstream of the heater so that the curing step may be performed shortly after the applied ink is dried, although other configurations are also contemplated.

When the aqueous energy curable inkjet inks are formulated with a photoinitiator (F), a satisfactory degree of curing may be accomplished using UV light. Suitable UV light sources include, but are not limited to, a H-type UV bulb (mercury vapor bulb), short-wave UV lamps, incandescent lamps (halogen lamps) with a filter coating such as fused quartz, gas-discharge lamps, and a UV laser. Preferably, H-type UV bulbs are used for UV curing methods such as those with a maximum power of up to 600 watts/inch. In some embodiments, the aqueous energy curable inkjet inks are cured using UV light having a fluence (dose) of at least 350 mJ/cm$^2$, preferably at least 500 mi/cm$^2$, preferably at least 600 mJ/cm$^2$, preferably at least 700 mJ/cm$^2$, more preferably at least 800 mJ/cm$^2$, even more preferably at least 900 mJ/cm$^2$, yet even more preferably at least 1,000 mJ/cm$^2$, and up to 1,500 mJ/cm$^2$, preferably up to 1,400 mJ/cm$^2$, more preferably up to 1,300 mi/cm$^2$, even more preferably up to 1,200 mJ/cm$^2$, yet even more preferably up to 1,100 mJ/cm$^2$.

Alternatively, the aqueous energy curable inkjet inks may be cured using EB energy regardless of whether a photoinitiator (F) is present or not. In electron beam curing methods, electrons emerge from a vacuum chamber through a metal foil and reach the aqueous energy curable inkjet ink on the substrate in a reaction chamber. Electron beam curing processes typically generate little heat and thus help prevent substrate distortion from thermal processing. Upon exposure to electron beam radiation, any curable/photopolymerizable components present in the aqueous energy curable inkjet ink (e.g., the water-soluble photopolymerizable monomer (B)) will undergo polymerization, crosslinking, and/or hardening.

The aqueous energy curable inkjet inks may be exposed to electron beam radiation using any electron beam generator, such as electron beam generators available from Electron Crosslinking AB (Sweden), Comet AG (Switzerland) or Energy Sciences, Inc. (ESI) (USA). In some embodiments, the aqueous energy curable inkjet inks are cured to a satisfactory degree by being exposed to a dose of electron beam radiation of at least 0.5 Mrad, preferably at least 1 Mrad, preferably at least 1.5 Mrad, preferably at least 2 Mrad, more preferably at least 2.5 Mrad, even more preferably at least 3 Mrad, yet even more preferably at least 3.5 Mrad, and up to 10 Mrad, preferably up to 9 Mrad, preferably up to 8 Mrad, preferably up to 7 Mrad, more preferably up to 6 Mrad, even more preferably up to 5 Mrad, yet even more preferably up to 4 Mrad. The dose of electron beam radiation can be adjusted based on the dimensions and surface characteristics of the substrate, the coating thickness of the aqueous energy curable inkjet inks, and/or the desired level of curing, for example by reducing or increasing the dosage and/or exposure time.

Various electron beam accelerating potentials may be employed in the methods disclosed herein, however, an accelerating potential of less than 300 kV is typically used, preferably less than 260 kV, more preferably less than 240 kV, even more preferably less than 220 kV, for example in a range of about 70 to about 200 kV.

The method of the present disclosure may optionally include supplying an inert gas during curing operations to displace oxygen ("inerting") which inhibits free-radical polymerization. In some embodiments, less than about 200 ppm, preferably less than 180 ppm, more preferably less than 160 ppm, even more preferably less than 140 ppm oxygen is present during curing. Any suitable inert gas may be used including, but not limited to, nitrogen gas and argon gas.

It should also be recognized that substrate surface treatments such as corona treatment, atmospheric plasma treatment, and/or flame treatment may optionally be employed in the methods herein prior to application of the aqueous energy curable inkjet inks to improve printed article characteristics, for example ink adhesion. These surface treatment processes may take place in-line (i.e., during the production run) or off-line (i.e., the substrate is surface treated prior to the production run, for example during the manufacturing of the substrate at a separate facility). The parameters of such substrate surface treatments may be varied greatly depending on the substrate material to be printed, the specific aqueous energy curable inkjet inks utilized, the printing method applied, and the desired properties and applications of the printed article.

The examples below are intended to further illustrate the aqueous energy curable inkjet inks and are not intended to limit the scope of the claims.

EXAMPLES

Aqueous Energy Curable Inkjet Inks

Several example aqueous energy curable inkjet inks are given in Tables 1-3 below. The amount of each component is expressed in terms of weight percentage relative to a total weight of 100%. SR551 is methoxy polyethylene glycol (350) monoacrylate, SR344 is polyethylene glycol (400) diacrylate, SR610 is polyethylene glycol (600) diacrylate, and SR9035 is ethoxylated (15) trimethylolpropane triacrylate, each available from Sartomer Co. Inc. PVP K-12 is a low molecular weight (4,000-6,000 g/mol) homopolymer of polyvinylpyrrolidone (PVP), available from Ashland. AQUAZOL 5 is a poly(2-ethyl-2-oxazoline) having a target molecular weight of 5,000 g/mol, available from Polymer Chemistry Innovations. UCECOAT 2801 is an acrylated polyurethane dispersion (anionic) in water, available from Allnex. TEGO Twin 4100 is a polysiloxane-based gemini surfactant, available from Evonik Industries. OMNIRAD 2959 is 1-[4-(2-hydroxyethoxyl)-phenyl]-2-hydroxy-2-methylpropanone (photoinitiator), available from IGM resins. JCCL-PE wax is a synthetic polyethylene wax made by Kao Corp. Japan. COATOSIL MP 200 silane is a gamma-glycidoxypropyl(methoxy)silane oligomer, available from Momentive. Carbon black PBL 7 is a black pigment available from Cabot. "Comp. Ex" refers to a comparative example.

Preparation Methods

The inks were prepared by combining the non-photopolymerizable resin (A), the water-soluble photopolymerizable monomer (B), and water (D), and any desired optional ingredient (e.g., the organic solvent (D1), the surfactant (E), the photoinitiator (F), the wax (G), the silane (H), and the

TABLE 1

Aqueous energy curable inkjet ink Examples 1-8 and Comparative Example 1

| Raw Material | Component | UV Ex 1 | Comp. Ex 1* | Ex 2 | Ex 3 | Ex 4 | EB Ex 5 | Ex 6 | Ex 7 | Ex 8 |
|---|---|---|---|---|---|---|---|---|---|---|
| SR551 | B1 | 22.0 | 50.0 | 18.0 | 20.0 | 20.0 | 22.0 | 18.0 | 20.0 | 20.0 |
| SR9035 | B2 | 30.4 | — | 27.0 | 32.0 | 32.0 | 30.4 | 27.0 | 32.0 | 32.0 |
| PVP K-12 | A | 1.6 | — | 1.6 | 1.6 | 1.6 | 1.6 | 1.6 | 1.6 | 1.6 |
| UCECOAT 2801 | — | — | 20.0 | — | — | — | — | — | — | — |
| Water | D | 39.4 | 24.6 | 36.8 | 38.8 | 38.8 | 41.8 | 39.2 | 41.2 | 41.2 |
| TEGO Twin 4100 | E | 1.2 | — | 1.2 | 1.2 | 1.2 | 1.2 | 1.2 | 1.2 | 1.2 |
| Propylene glycol | D1 | — | — | 10.0 | — | — | — | 10.0 | — | — |
| OMNIRAD 2959 | F | 2.4 | 2.4 | 2.4 | 2.4 | 2.4 | — | — | — | — |
| JCCL-PE wax | G | — | — | — | 1.0 | — | — | — | 1.0 | — |
| COATOSIL MP 200 | H | — | — | — | — | 1.0 | — | — | — | 1.0 |
| carbon black PBL 7 | C | 3.0 | 3.0 | 3.0 | 3.0 | 3.0 | 3.0 | 3.0 | 3.0 | 3.0 |
| Total | | 100.00 | 100.00 | 100.00 | 100.00 | 100.00 | 100.00 | 100.00 | 100.00 | 100.00 |

*JP 2012097191 - incorporated herein by reference in its entirety

TABLE 2

Aqueous energy curable inkjet ink Examples 9-17 and Comparative Example 2

| Raw Material | Component | Ex 9 | Ex 10 | Ex 11 | Ex 12 | Ex 13 | Ex 14 | Ex 15 | Ex 16 | Ex 17 | Comp. Ex 2 |
|---|---|---|---|---|---|---|---|---|---|---|---|
| SR551 | B1 | 27.5 | 27.5 | 27.5 | 50.0 | — | — | — | 27.5 | 27.5 | 27.5 |
| SR610 | B2 | 38.0 | — | — | — | 50.0 | — | — | — | — | — |
| SR344 | B2 | — | 38.0 | — | — | — | 50.0 | — | — | — | — |
| SR9035 | B2 | — | — | 38.0 | — | — | — | 50.0 | 12.5 | 20.5 | 22.5 |
| PVP K-12 (10% solution in water) | A | 20.0 | 20.0 | 20.0 | 20.0 | 20.0 | 20.0 | 20.0 | 20.0 | 20.0 | — |
| OMNIRAD 2959 | F | 3.0 | 3.0 | 3.0 | 3.0 | 3.0 | 3.0 | 3.0 | 3.0 | 3.0 | 3.0 |
| Water | D | 7.0 | 7.0 | 7.0 | 22.5 | 22.5 | 22.5 | 22.5 | 27.5 | 23.5 | 42.5 |
| TEGO Twin 4100 | E | 1.5 | 1.5 | 1.5 | 1.5 | 1.5 | 1.5 | 1.5 | 1.5 | 1.5 | 1.5 |
| JCCL-PE wax | G | — | — | — | — | — | — | — | 5.0 | — | — |
| COATOSIL MP 200 | H | — | — | — | — | — | — | — | — | 1.0 | — |
| carbon black PBL 7 | C | 3.0 | 3.0 | 3.0 | 3.0 | 3.0 | 3.0 | 3.0 | 3.0 | 3.0 | 3.0 |
| Total | | 100.00 | 100.00 | 100.00 | 100.00 | 100.00 | 100.00 | 100.00 | 100.00 | 100.00 | 100.00 |

TABLE 3

Aqueous energy curable inkjet ink Examples 18-20

| Raw Material | Component | Ex 18 | Ex 19 | Ex 20 |
|---|---|---|---|---|
| SR551 | B1 | 27.5 | 27.5 | 27.5 |
| SR610 | B2 | 38.0 | — | — |
| SR344 | B2 | — | 38.0 | — |
| SR9035 | B2 | — | — | 38.0 |
| AQUAZOL 5 (10% solution in water) | A | 20.0 | 20.0 | 20.0 |
| OMNIRAD 2959 | F | 3.0 | 3.0 | 3.0 |
| Water | D | 7.0 | 7.0 | 7.0 |
| TEGO Twin 4100 | E | 1.5 | 1.5 | 1.5 |
| carbon black PBL 7 | C | 3.0 | 3.0 | 3.0 |
| Total | | 100.00 | 100.00 | 100.00 | additive (I) (e.g., optical brightener, stabilizer, security taggant, etc.)) and the contents were stirred at 25° C. until a uniform dispersion was formed. Then, the pigment having an average particle size of 50 to 300 nm (B) was added, and the resulting mixture stirred at 25° C. until a uniform dispersion was formed.

Aqueous Energy Curable Inkjet Ink Evaluation Methods

Drying Speed Measurements

Drying speeds may be measured as the amount of water or other volatile components lost (in mg) per area of coverage under applied heat within a specific time (units of $mg/cm^2 \cdot s$).

To perform the drying speed evaluation, a substrate was first weighed and the weight recorded. Next, a fresh sample was prepared by applying an aqueous energy curable inkjet ink to be tested onto the substrate, and a weight of the fresh sample was measured and recorded. The fresh sample was then dried at 60° C. for two (2) minutes, and the dried sample was re-weighed to determine the weight loss of the aqueous energy curable inkjet ink after accounting for the weight of the substrate. The drying speed results are expressed in terms of weight loss by subtracting a percentage of the dried aqueous energy curable inkjet ink relative to the starting weight of the newly applied aqueous energy curable inkjet ink from 100, and categorized according to Table 4.

TABLE 4

Drying speed categories

| Weight Loss | Result |
|---|---|
| 0-<25% | 3 - Fail, slow drying |
| 25-35% | 2 - Pass, acceptable drying |
| >35% | 1 - Pass, fast drying |

Curing Speed Measurements

The curing speed of the aqueous energy curable inkjet inks were measured by subjecting a dried sample (prepared according to the drying speed measurements above) to either
(i) UV cure conditions with a UV fluence (dose) of 1,000 mJ/cm$^2$ using a H-type UV bulb, or
(ii) EB cure conditions with a 3.5 Mrad dose of electron beam radiation using an electron beam generator from Comet AG, Switzerland.

The surface condition (tack) of the cured inks was then determined by finger (using touch), and categorized according to Table 5.

TABLE 5

Curing speed categories

| Surface Condition | Result |
|---|---|
| Tacky, tack does not fade over time, ink can be rubbed off | 3 - Fail, slow curing |
| Slight tack, tack fades over time | 2 - Pass, acceptable curing |
| No tack | 1 - Pass, fast curing |

Aqueous Energy Curable Inkjet Ink Performance

TABLE 6

Performance of Examples 9-17 and Comparative Example 2

| | Ex 9 | Ex 10 | Ex 11 | Ex 12 | Ex 13 | Ex 14 | Ex 15 | Ex 16 | Ex 17 | Comp. Ex 2 |
|---|---|---|---|---|---|---|---|---|---|---|
| Drying Speed | 1 | 1 | 1 | 3 | 3 | 1 | 2 | 1 | 1 | 2 |
| Curing Speed (UV) | 1 | 1 | 1 | 3 | 2 | 1 | 2 | 1 | 1 | 2 |
| Curing Speed (EB) | 1 | 1 | 1 | 3 | 2 | 2 | 2 | 1 | 1 | 2 |

TABLE 7

Performance of Examples 18-20

| | Ex 18 | Ex 19 | Ex 20 |
|---|---|---|---|
| Drying Speed | 1 | 1 | 1 |
| Curing Speed (UV) | 1 | 1 | 1 |
| Curing Speed (EB) | 1 | 1 | 1 |

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. An aqueous energy curable inkjet ink, comprising:
(A) a non-photopolymerizable resin;
(B) a water-soluble photopolymerizable monomer;
(C) a pigment having an average particle size of 50 to 300 nm; and
(D) at least 25 wt. % water, based on a total weight of the aqueous energy curable inkjet ink,
wherein the non-photopolymerizable resin (A) is a polyvinylpyrrolidone or a poly(2-oxazoline), and
wherein the water-soluble photopolymerizable monomer (B) is a mixture of (B1) a mono-ethylenically unsaturated monomer and (B2) a poly-ethylenically unsaturated monomer.

2. The aqueous energy curable inkjet ink of claim 1, wherein the non-photopolymerizable resin (A) has a weight average molecular weight of 4,000 to 6,000 g/mol.

3. The aqueous energy curable inkjet ink of claim 1, wherein the non-photopolymerizable resin (A) is water-soluble and has a Hansen solubility parameter (δ) of 23.0 to 27.0 MPa1/2.

4. The aqueous energy curable inkjet ink of claim 1, wherein the non-photopolymerizable resin (A) is present in an amount of 0.1 to 10 wt. %, based on a total weight of the aqueous energy curable inkjet ink.

5. The aqueous energy curable inkjet ink of claim 1, wherein the water-soluble photopolymerizable monomer (B) is present in an amount of 30 to 70 wt. %, based on a total weight of the aqueous energy curable inkjet ink.

6. The aqueous energy curable inkjet ink of claim 1, wherein the water-soluble photopolymerizable monomer (B) comprises (poly)alkylene glycol functionality.

7. The aqueous energy curable inkjet ink of claim 1, wherein the pigment (C) is uncoated.

8. The aqueous energy curable inkjet ink of claim 1, wherein the pigment (C) is present in an amount of 0.1 to 10 wt. %, based on a total weight of the aqueous energy curable inkjet ink.

9. The aqueous energy curable inkjet ink of claim 1, further comprising (D1) an organic solvent.

10. The aqueous energy curable inkjet ink of claim 1, further comprising (E) a surfactant.

11. The aqueous energy curable inkjet ink of claim 1, further comprising (F) a photoinitiator.

12. The aqueous energy curable inkjet ink of claim 1, which is substantially free of (F) a photoinitiator.

13. The aqueous energy curable inkjet ink of claim 1, further comprising (G) a wax.

14. The aqueous energy curable inkjet ink of claim 13, wherein the wax (G) is a polyolefin wax.

15. The aqueous energy curable inkjet ink of claim 1, further comprising (H) a silane.

16. A printed article, comprising:
   a substrate and a dried and cured form of the aqueous energy curable inkjet ink of claim 1 disposed on the substrate.

17. A method of forming a printed image on a substrate, comprising:
   applying the aqueous energy curable inkjet ink of claim 1 onto the substrate with an inkjet printhead;
   drying; and then
   curing the aqueous energy curable inkjet ink.

18. The method of claim 17, wherein the aqueous energy curable inkjet ink is dried at a drying temperature of 50 to 70° C. for 1 to 2 minutes, which results in a weight loss of the aqueous energy curable inkjet ink of at least 25 wt. %, based on a total weight of the aqueous energy curable inkjet ink applied to the substrate.

\* \* \* \* \*